P. FRAIZER & E. A. NATION.
DISH WASHER.
APPLICATION FILED JUNE 5, 1914.

1,148,305.   Patented July 27, 1915.

WITNESSES:
Yost Braddock
Josephine Gasper

INVENTORS
PERRY FRAIZER
ENOCH A. NATION
BY
Hood & Schley.
ATTORNEYS

UNITED STATES PATENT OFFICE.

PERRY FRAIZER AND ENOCH A. NATION, OF NEWCASTLE, INDIANA.

DISH-WASHER.

1,148,305.

Specification of Letters Patent.

Patented July 27, 1915.

Application filed June 5, 1914. Serial No. 843,140.

*To all whom it may concern:*

Be it known that we, PERRY FRAIZER and ENOCH A. NATION, citizens of the United States, residing at Newcastle, in the county of Henry and State of Indiana, have invented a new and useful Dish-Washer, of which the following is a specification.

It is the object of our invention to provide an efficient dish-washer which is so simple in structure and operation and so inexpensive that it can be purchased and operated by the ordinary housewife.

The accompanying drawing illustrates our invention.

Figure 1:
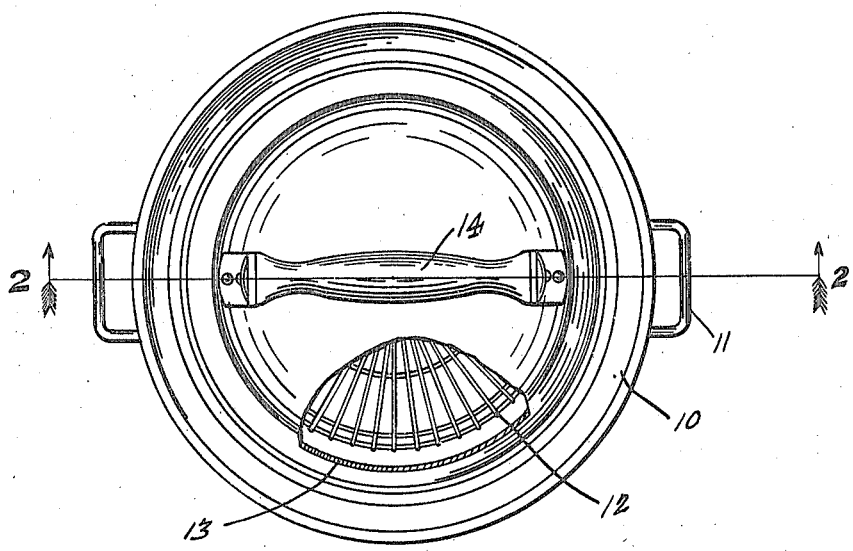
Figure 2:
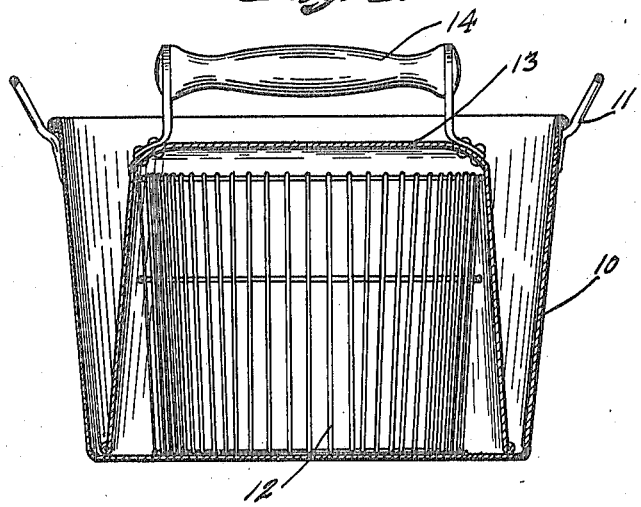

Figure 1 is a plan view of a dish-washer embodying our invention, some parts being broken away; and Fig. 2 is a section on the line 2—2 of Fig. 1.

The outside water container 10 may be in the form of an ordinary bucket or pan, and is conveniently made of sheet metal and provided with two ordinary lifting handles 11. A perforated dish-holder or basket 12, conveniently made of wire, may be put into the pan 10 or be removed therefrom as desired, this basket 12 being sufficiently smaller than the pan 10 to provide ample room between them when they are nested together for an air tight bell 13, open at the bottom and closed at the top and having any suitable operating means, such as the handle 14. The bell 13, which is also conveniently made of sheet metal, is movable also, but when in place covers the basket 12 and extends loosely downward between its sides and the circumjacent sides of the pan 10.

In operation, the dishes to be washed are placed in the perforated dish-container or basket 12, and the latter with the dishes placed within the pan 10, which is partially filled with water. Then the bell 13 is placed over the basket so that its lower edge projects into the water in the pan 10, the bell preferably being tilted somewhat as its lower edge passes below the surface of the water so as to permit part of the air within the bell to escape. Then the bell 13 is reciprocated up and down in the pan 10, as by the handle 14, and by such reciprocation the water in the pan 10 is caused to flow rapidly first in one direction and then in the other over the dishes in the basket 12, the water rising and falling outside of the bell as the bell descends and ascends respectively. A few reciprocations ordinarily cleanses the dishes. Then the bell 13 is removed, and the dishes taken out of the basket 12, which may be removed if desired and set to one side to allow the water to drain from the dishes.

We claim as our invention:

1. A dish-washer, comprising the combination of a water container, a perforated dish holder removably supported within said water container, and an air tight bell which surrounds said dish holder and is within said water container and is reciprocable up and down relatively to said water container and dish holder.

2. A dish-washer, comprising the combination of a water container, a perforated dish holder supported within said water container, and an air tight bell which surrounds said dish holder and is within said water container and is reciprocable up and down relatively to said water container and dish holder.

3. A dish-washer, comprising the combination of a water container, and a dish-encompassing bell open at the bottom and closed at the top reciprocable up and down within said water container, the bell being materially smaller in horizontal cross section than is said water container but sufficiently large to extend down around the dishes to be washed.

4. A dish-washer, comprising the combination of a water container, and a dish-encompassing bell open at the bottom and closed at the top reciprocable up and down within said water container, the bell being sufficiently large to extend down around the dishes to be washed.

5. A dish-washer, comprising the combination of a water container, and a bell open at the bottom and closed at the top reciprocable up and down within said water container, the bell being materially smaller in horizontal cross section than is said water container, and means for supporting dishes in said water container in position so that they will be surrounded by said bell when the latter is in said water container.

6. A dish-washer, comprising the combination of a water container, and a bell open at the bottom and closed at the top reciprocable up and down within said water container, and means for supporting dishes in said water container in position so that they will be surrounded by said bell when the latter is in said water container.

7. A dish-washer, comprising the combination of a water container, a dish-encompassing bell open at the bottom and closed at the top reciprocable up and down within said water container, the bell being materially smaller in horizontal cross section than is said water container but sufficiently large to extend down around the dishes to be washed, and means for preventing the bell in its movements from striking the dishes.

8. A dish-washer, comprising the combination of a water container, a dish-encompassing bell open at the bottom and closed at the top reciprocable up and down within said water container, the bell being sufficiently large to extend down around the dishes to be washed, and means for preventing the bell in its movements from striking the dishes.

In witness whereof, we have hereunto set our hands at Newcastle, Indiana, this second day of June, A. D. one thousand nine hundred and fourteen.

PERRY FRAIZER.
ENOCH A. NATION.

Witnesses:
EMMA LIZAR,
CHAS. O. MOGLE.